United States Patent Office 3,686,243
Patented Aug. 22, 1972

3,686,243
PROCESS FOR PREPARATION OF ZINC DIALKYL DITHIOPHOSPHATES
Orville W. Rigdon, Groves, Robert S. Edwards, Nederland, and William J. Powers III, Port Arthur, Tex., assignors to Texaco Inc., New York, N.Y.
No Drawing. Filed Nov. 12, 1970, Ser. No. 89,011
Int. Cl. C07f 3/06
U.S. Cl. 260—429.9     5 Claims

ABSTRACT OF THE DISCLOSURE

A process for preparation of zinc dialkyl dithiophosphates which comprises reacting, in a closed system, dialkyldithiophosphoric acids with a basic zinc salt in a heptane slurry at temperatures ranging from about 180°–300° F. and under autogenous pressure conditions, the resulting zinc dialkyldithiophosphates serving as antioxidants and as anticorrosion and antiwear agents in a variety of lubricating oil compositions.

BACKGROUND OF THE INVENTION

Lubricating oils, diesel oils, mineral oils, fuel oils, and the like are utilized in a wide variety of applications wherein, as a result of exposure to atmospheric conditions and/or elevated temperatures and/or severe operating conditions, thermal and oxidative degradation are frequently encountered. Such degradation is usually manifested by deterioration in appearance, physical properties and performance of the oil product. For example, the formation and deposition of so-called varnishes and sludge on engine surfaces is due primarily to oxidation and polymerization of lubricating oils. Such deposits are undesirable inasmuch as they contribute to wear and corrosion of the engine surfaces.

A wide variety of additives has been proposed in an effort to find an effective means of stabilizing such oil products. In addition to providing effective stabilization, such additives must also be resistant to their own degradation upon exposure to oxidative and thermal conditions. Particularly effective additives which exhibit desirable antioxidant and detergent properties are the heavy metal salts of esters of dithiophosphoric acid, and notably the zinc salts. The basic method for preparing such materials involves reacting alkyl or aralkyl compounds with phosphorus pentasulfide and thereafter neutralizing the resulting dithiophosphoric acid with zinc oxide or zinc hydroxide at temperatures not exceeding about 180° F. and at atmospheric pressure, i.e.

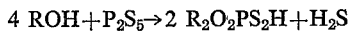
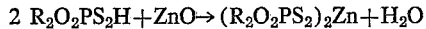

Certain variations in this basic procedure have been disclosed such, for example, as conducting the process in a mineral oil solution, utilizing olefin-phenol reaction products in the preparation of the acid product, and reacting the dialkyl dithiophosphoric acid with finely divided zinc.

It should be noted, however, that few of the prior art procedures for preparing such dithiophosphates, and particularly the basic method, have proven entirely satisfactory. For example, the basic procedure described hereinabove has, at best, been a marginal procedure with regard to consistently producing dithiophosphates with acceptable stability. Thus, widely varying properties have been noted in consecutive batches of material, the lack of stability being identified by evolution of hydrogen sulfide on the part of the dithiophosphate material. Needless to say, this lack of predictability in performance negates the useful properties of the product. Attempts to rework the unsuitable batches by reneutralization or by blending with acceptable material have been time-consuming operations which do not necessarily guarantee an improvement in the quality of the resulting product.

The basic process also appears susceptible to subtle variations in operating conditions and charge stocks, particularly phosphorus pentasulfide ($P_2S_5$) quality, and is in general difficult to control using conventional manufacturing techniques. For example, it has been observed that lower phosphorus sulfides ($P_4S_3$ and $P_4S_7$) which may be present in certain batches of commercial $P_2S_5$ used for dialkyldithiophosphoric acid preparation, will cause the formation of unstable zinc dialkyl dithiophosphates upon neutralizing the acid with zinc oxide in the conventional manner. Furthermore, the preparation of the acid utilizing amounts of $P_2S_5$ in excess of that required by the reaction stoichiometry combined with the subsequent conventional neutralization technique results in the preparation of highly unstable zinc salts.

In addition, the effectiveness of the zinc dialkyl dithiophosphates prepared in the conventional manner varies widely depending on the oil substrate being utilized.

SUMMARY OF THE INVENTION

The primary object of this invention is to provide a process for preparing zinc dialkyl dithiophosphates which substantially overcomes the disadvantages inherent in the prior art processes.

A further object is to prepare zinc dialkyl dithio phosphates which consistently exhibit a high degree of thermal stability and resistance to hydrogen sulfide evolution.

Various other objects and advantages of this invention will become apparent from the following description thereof.

It has now been discovered that by neutralizing dialkyldithiophosphoric acids with a basic zinc salt in a heptane slurry at temperatures ranging from about 180–300° F. and under autogenous pressure conditions, zinc dialkyl dithiophosphates are produced which exhibit outstanding resistance to hydrogen sulfide evolution under prolonged heating and exceptional thermal stability. Furthermore, the novel introduction of high temperatures and pressures enables the process to overcome the disadvantages inherent in the prior art processes. Thus, the zinc dialkyl dithiophosphate products consistently exhibit acceptable $H_2S$ and thermal stability, thereby eliminating the need for any time consuming reneutralization or blending operations. The process is not sensitive to subtle variations in the reactants, such as the presence of lower phosphorus sulfides in the phosphorus pentasulfide charge stock. The improved process of this invention also is capable of satisfactorily neutralizing dialkyl dithiophosphoric acids which were prepared under adverse processing conditions, such as an imbalance in the reactant concentrations. In addition, the zinc dialkyl dithiophosphate products exhibit acceptable thermal and blended $H_2S$ stability in a wide variety of oil substrates.

DESCRIPTION OF THE PREFERRED EMBODIMENTS

In general, the improved process of this invention involves reacting, in a closed pressure system, dialkyl dithiophosphoric acid and a basic zinc salt in a heptane slurry at a temperature ranging between 180°–300° F. and under autogenous pressure conditions.

Methods for preparing dialkyl dithiophosphoric acids are well known to those skilled in the art. A typical procedure involves heating a mixture of heptane solvent and phosphorus pentasulfide ($P_2S_5$) and adding thereto, under agitation, an alkanol or a mixture of alkanols. Heating is continued until the reaction is complete whereupon the distillate is removed, the remaining mixture cooled and filtered to remove residual phosphorus pentasulfide, and the dialkyl dithiophosphoric acid recovered. For purposes of convenience and brevity in this specification, the dialkyl dithiophosphoric acids will be referred to by the designation "DDP acid."

A variety of basic zinc salts may be effectively utilized as neutralization agents in the novel process of this invention. While zinc oxide is the preferred and most frequently used salt, zinc hydroxide, zinc carbonate, and the like as well as mixtures of any of these salts may also be utilized. In using zinc hydroxide, it is necessary to extend the water removal time since an increase in the amount of water of reaction is noted during neutralization with zinc hydroxide. When zinc carbonate is utilized, provision must be made for venting by-product $CO_2$ from the reactor in order to avoid an excessive pressure build-up.

The actual neutralization procedure of the invention is conducted in a closed pressure vessel in an inert gaseous atmosphere, such as under nitrogen gas. The heptane solvent and the basic zinc salt are then charged into the reactor. The zinc salt is used in a concentration ranging from a stoichiometric quantity up to about a 30% excess, by weight, over the stoichiometric quantity, these concentrations being based on the DDP acid charge. The DDP acid is then charged to the reactor and the entire mix is vigorously agitated. The reaction vessel is vented to atmospheric pressure and then sealed from the atmosphere in order to insure the attainment of autogenous pressure during the reaction period.

The reaction is conducted at a temperature ranging from about 180°–300° F., and preferably from about 210°–240° F., for a period generally from about ½ to 6 hours. During the heating period, autogenous pressure is built-up in the reactor, these pressure values generally ranging from about 20 to 35 pounds per square inch gauge. At the end of the reaction period, the heat to the reactor is reduced and the reactor is depressurized. Thereafter, the water formed during the course of the reaction is removed, this water removal being facilitated by a stream of nitrogen blown through the reactor. The reactor contents are then cooled, the crude zinc dialkyl dithiophosphate mixture filtered to remove unreacted zinc salt, the heptane solvent removed and the dithiophosphate purified to yield the refined zinc dialkyl dithiophosphate product. Once again for purposes of convenience and brevity in this specification, the zinc dialkyl dithiophosphate produced will be referred to by the designation "ZDDP."

Although heptane mixtures are the only solvent specified in the previous description, it should be noted that it is possible to utilize a higher boiling solvent, e.g., toluene, iso-octane, xylenes, ethyl benzene and the like, or a mixture of heptane and the higher boiling solvent for formulating the DDP acid and for neutralization of the DDP acid to yield the ZDDP.

While the ZDDP products resulting from the novel process of this invention exhibit a consistently high level of $H_2S$ and thermal stability, it has been discovered that the addition of a specified amount of water during the neutralization procedure results in the preparation of a ZDDP product which exhibits a further increased $H_2S$ stability when blended with a solvent neutral oil. A solvent neutral oil is a lubricating oil distillation fraction that has been further processed by solvent refininng and solvent dewaxing. Examples of solvent neutral oils include:

SOLVENT NEUTRAL OILS

| SAE grade | 5 | 20 | 40 |
| --- | --- | --- | --- |
| Gravity, API | 34 | 29.5 | 28 |
| SUS viscosity at 100° F | 100 | 335 | 850 |
| SUS viscosity at 210° F | 40 | 54 | 77 |
| Viscosity index | 100 | 95 | 90 |

Thus, the introduction of from about .75 to 1.50 molar amount of water, and preferably an equimolar amount of water, based on the zinc salt consumed in the reaction, at a point in time approximately ⅗ to ⁷⁄₁₀ through the neutralization reaction, and preferably ⅔, will provide the improved blended $H_2S$ stability. It should be noted that the specified amount of water added and the specified time of the addition are critical. Thus, the addition of an appropriate amount of water at the initiation of the reaction will not afford the improved stability. Likewise, the addition of a half molar equivalent of water at the appropriate time will also not yield the improved stability. Furthermore, the addition of an appropriate amount of water during the course of the reaction but not during the specified time interval, yields a ZDDP product which, although exhibiting an improved blended stability, has a milky white appearance and is difficult to filter from the excess zinc salt upon removal from the reactor. Such unacceptable appearance and filtration characteristics are also noted when the water dosage is increased to twice the molar equivalent of zinc salt consumed. It is thus seen that the addition of an appropriate amount of water at an appropriate time in the neutralization reaction, represents a unique approach in providing improved blended $H_2S$ stability.

As previously indicated, zinc dialkyl dithiophosphates are useful in any oil substrates wherein oxidative or thermal degradation is a problem. Among such oil substrates are included: lubricating oils such as those of the aliphatic ester type, e.g. dihexylazelate, di-(2-ethylhexyl)azelate, di-(3,5,5 - trimethylhexyl)glutarate, di-(3,5,5 - trimethylpentyl)glutarate, di - (2 - ethylhexyl) pimelate, di - (2 - ethylhexyl)adipate, diisoamyl adipate, triamyl tricarballate, pentaerythritol tetracaprolate, dipropylene glycol dipelargonate, 1,5-pentanediol di-(2-ethylhexanoate), and the like; diesel oils; mineral oils; fuel oils; oils of animal and vegetable origin such as linseed oil, castor oil, and menhaden oil; and the like.

The ZDDP stabilizers may be intimately admixed with the oil substrate by any suitable means. The oil substrate may be utilized directly in its intended application or stored for future use. In order to provide long lasting stability to the oil substrate, it is sufficient to utilize as little as about 0.5% ZDDP, based on the weight of the substrate.

The following examples will further illustrate the embodiment of this invention.

EXAMPLE I

This example illustrates the preparation of zinc dialkyl dithiophosphate by means of the novel process of this invention. A reaction vessel fitted with a dropping funnel, reflux condenser, heating means and means for mechanical agitation was charged with 2192 grams of a heptane mixture. Provision was made for delivering non-condensable hydrogen sulfide gas to a caustic scrubber and then 2176 grams of phosphorus pentasulfide ($P_2S_5$) was added to the reaction vessel. The mixture of heptane and $P_2S_5$ was heated to 160–165° F., while under vigorous agitation, whereupon an alcohol mixture of 2715 grams of methyl isobutylcarbinol (MIBC) and 1347 grams of isopropyl alcohol (IPA) was added at a uniform rate over a one hour period. The MIBC: IPA molar ratio was thus 1.18 while the total alcohol: $P_2S_5$ molar ratio was 5:1. The temperature of the mixture was raised to 180° F. over a 3.5 hour reaction period. A portion of the distillate was removed whereupon the remaining dialkyl dithiophosporic (DDP) acid-solvent mixture was cooled to room temperature and filtered to remove unreacted $P_2S_5$. The resulting acid had a total acid number of 173.3.

A closed pressure vessel connected to an overhead system consisting of a reflux condenser and pressure gauges and fitted with heating means and means for mechanical agitation was charged with 145 grams of heptane solvent and 120 grams zinc oxide (15 wt. percent excess based on DDP acid charge). The vessel was purged with nitrogen whereupon 820 grams of DDP acid prepared hereinabove was charged to the reactor. The apparatus was vented to atmospheric pressure, and then sealed from the atmosphere so that the reactor and overhead could attain autogenous pressure when heated. This permitted attainment of a higher reaction temperature than could normally be realized with an open system at atmospheric pressure.

The contents of the reactor was rapidly heated to 225° F. Heating at 225° F. was continued for 90 minutes. During this interval the reactor pressure rose to 20–30 p.s.i.g. At the end of the 90 minute reaction period, heat to the reactor was reduced, and the system was vented to atmospheric pressure over a one-half hour period while maintaining a moderate liquid reflux in the overhead condensing system. Nitrogen blowing to the reactor was simultaneously started at a rate of about 1000 ml./min. This was done to facilitate water removal during the water removal period which was started at the beginning of depressurization and was continued for a total of 60 minutes. Water, which condensed from the refluxing water-heptane azeotrope, was retained in the water trap while heptane was returned to the reactor. During the water removal period the reflux temperature of the liquid mixture dropped to 180–190° F. and then rose to 200–210° F. by the end of the period.

When water removal was accomplished, the reaction mixture was allowed to cool at ambient temperatures. The crude zinc dialkyl dithiophosphate was filtered to remove unreacted zinc oxide, stripped at 170–175° F. to remove heptane solvent and further filtered at 150° F. to afford the refined zinc dialkyl dithiophosphate.

EXAMPLE II

This example illustrates the excellent stability characteristics exhibited by the zinc dialkyl dithiophosphates prepared by the novel process of this invention. It also compares these characteristics with the stability exhibited by conventionally prepared zinc dialkyl dithiophosphates.

As a control product, a conventional zinc dialkyl dithiophosphate was prepared in a reaction vessel fitted with reflux condenser, heating means, and means for mechanical agitation which was charged with 289 grams of a heptane mixture and 240 grams of zinc oxide (15 wt. percent excess). The mixture was vigorously agitated whereupon 1640 grams of the dialkyl dithiophosphoric acid prepared in Example I, hereinabove, was added over a one hour period at ambient temperatures. The well stirred mixture was then heated, according to the following temperature program:

(a) Ambient to 170° F.—end of 1st hour
(b) 170–175° F.—end of 2nd hour
(c) 175–180° F.—end of 3rd hour During this 3-hour reaction period, the reaction mixture was maintained in a state of total reflux return.

At the end of the above 3-hour period, nitrogen was blown through the system at a rate of Ca. 1200 ml./min. (STP) to facilitate removal of water. The reaction system was maintained at reflux during the water removal period which was of four hours duration. Characteristically the temperature of the mixture rose to 190–200° F. by the end of the water removal period.

When water removal was accomplished, the reaction mixture was allowed to cool to ambient temperature. The crude ZDDP mixture was filtered to remove unreacted zinc oxide, stripped at 170–175° F. under reduced pressure to remove heptane solvent, and finally polish filtered at 150° F. to afford the refined ZDDP.

The following test procedures were utilized in order to determine the stability properties:

H₂S STABILITY TEST

A sample of the cutback zinc oxide neutralization mix is filtered and approximately 100 cc. is charged to a 250 cc. iodometric flask. The flask is placed on a steam bath and air purged for 1 hour. Lead acetate paper is suspended in the vapor space of the flask and observed for discoloration after 3½, 8 and 24 hours on the steam bath.

THERMAL STABILITY TEST

ZDDP (2.5 grams) and 10 P Pale Oil (7.5 grams) are blended in a 50 cc. Erlenmeyer flask. Lead acetate paper is suspended in the vapor space of the flask and observed for discoloration during a 30 minute heating period in an oil bath at 300° F. Samples which pass (no discoloration of lead acetate paper) at 300° F. are placed in a 320° F. oil bath for 30 minutes.

BLENDED STABILITY TEST

A blend containing 49.75 grams solvent neutral oil-20 and 0.25 grams ZDDP is prepared in a 250 cc. Erlenmeyer flask and immediately covered with lead acetate paper. The paper is observed for discoloration while the blend is stirred and heated in a 150° F. oil bath for 15 minutes.

The dithiophosphate product prepared in Example I, hereinabove, and four different batches of the conventionally prepared dithiophosphate product were then submitted to the stability tests, the results of these determinaions being presented in the following table:

|  | ZDDP (Ex. I) | Conventional ZDDP Run No. | | | |
| --- | --- | --- | --- | --- | --- |
|  |  | 1 | 2 | 3 | 4 |
| H₂S stability at 150–180° F. | >24 hrs. | >24 hrs. | 24 hrs. | 8 hrs. | >24 hrs. |
| Thermal stability at 300° F./30 min. | Pass | Borderline. | Fail | Fail | Pass. |
| Blended stability at 150° F./15 min. | Borderline. | Fail | do | do | Fail. |

The results presented above clearly indicate the improved stability exhibited by the zinc dialkyl dithiophosphate prepared by the novel process of this invention. They further reveal the difficulty in achieving consistent results with the conventional process.

EXAMPLE III

This example illustrates the insensitivity of the novel process of this invention to variations appearing in the charge stocks.

A commercial sample of phosphorus pentasulfide which could not be processed to form a stable ZDDP product was utilized to prepare DDP acid according to the procedure in Example I. The material appeared to process normally to DDP acid which exhibited a total acid number of 191.6. Thereafter, 1486 grams of the DDP acid were conventionally neutralized with 240 grams of zinc oxide according to the procedure of Example II. The resulting ZDDP product was then submitted to the H₂S stability test wherein failure was observed within ten minutes. Repetition of this conventional procedure using the defective P₂S₅, substantiated this inability to prepare a H₂S stable ZDDP product.

In contrast, neutralization of the DDP acid prepared from the defective P₂S₅, using the novel process of this invention, yielded highly stable ZDDP products. Thus, 743 grams of the DDP acid prepared hereinabove with the defective P₂S₅ was neutralized with 120 grams of zinc oixde at 225° F. according to the procedure set forth in Example I. The resulting ZDDP product was submitted to the stability tests described in Example II wherein it was determined that the product was H₂S stable over a period of 24 hours at 150°–180° F.; was thermally stable at 320° F. for 30 minutes; and showed only slight H₂S evolution when blended with the solvent neutral oil in the blended stability test.

The results described above clearly indicate that the novel process of this invention is insensitive to subtle variations in commercially available phosphorus pentasulfides, in contrast to the conventional neutralization process wherein defective $P_2S_5$ is almost impossible to process to a satisfactory ZDDP product.

EXAMPLE IV

This example further illustrates the insensitivity of the novel process of this invention to variations in the phosphorus pentasulfide product.

DDP acids were prepared according to the procedure of Example I with the exception that varying amounts of $P_4S_3$ or $P_4S_7$ were added to the $P_2S_5$ charge. Each bath of DDP acid was then divided and neutralized using both the conventional and the improved neutralization procedures. The resulting ZDDP products were then subjected to the $H_2S$ and thermal stability tests described in Example II. The results of these determinations are presented in the following table:

EXAMPLE VII

The procedure of Example V was repeated with the exception that 154 grams of zinc carbonate was used to neutralize the DDP acid. Furthermore, a back pressure regulator was utilized in the system in order to maintain a 25 p.s.i.g. pressure while allowing by-product $CO_2$ to escape. Once again, the properties of the resulting ZDDP product were comparable to those of the product prepared in Example V.

EXAMPLE VIII

The procedure in Example VII was repeated with the exception that 743 grams of defective DDP acid, as described in Example III, was neutralized with the zinc carbonate. The properties of the resulting ZDDP product were comparable to those of the previously prepared materials.

|  | Run No. | | | | | |
|---|---|---|---|---|---|---|
|  | 1 | | 2 | | 3 | |
| Procedure | Improved | Conv. | Improved | Conv. | Improved | Conv. |
| Wt. percent $P_4S_3$ in $P_2S_5$ for DDP prep | 0.5 | 0.5 | 1.0 | 1.0 | | |
| Wt. percent $P_4S_7$ in $P_2S_5$ for DDP prep | | | | | 1.0 | 1.0 |
| ZDDP product tests: | | | | | | |
| $H_2S$ stability, 150–180° F., 24 hours | Pass | Fail | Pass | Fail | Pass | Fail |
| Thermal stability 300° F., 30 min | do | do | do | do | do | Do. |

The data presented above further illustrates the ability of the improved high temperature neutralization procedure of this invention to yield $H_2S$ stable products regardless of the nature of the $P_2S_5$ reactant.

EXAMPLE V

The pressure reaction vessel described in Example I was charged with 820 grams of DDP acid, as prepared in Example I, 145 grams of heptane solvent and 147 grams of zinc hydroxide. The neutralization reaction was conducted as in Example I with the exception that the water removal time was extended from 60 to 90 minutes since twice as much water of reaction is produced during neutralization with zinc hydroxide. The resulting ZDDP product exhibited excellent $H_2S$ stability at 150°–180° F. for 24 hours, excellent thermal stability at 320° F. for 30 minutes and border line blended $H_2S$ stability in the solvent neutral oil at 150° F.

EXAMPLE VI

The procedure in Example V was repeated with the exception that 743 grams of the defective DDP acid, as described in Example III, was neutralized with the zinc hydroxide. The properties of the resulting ZDDP product were comparable to those of the product prepared in Example V.

EXAMPLE IX

This example illustrates the improved blended $H_2S$ stability in solvent neutral oil resulting from the addition of water during the neutralization process of this invention.

The ZDDP products of this example were prepared according to the procedure described in Example I hereinabove with the exception that deionized water was added to the reaction mixture during the neutralization operation. The following table presents the formulations used and the results obtained upon conducting the procedure under various process conditions.

|  | Grams | | | | | | |
|---|---|---|---|---|---|---|---|
| Formulation No | 1 | 2 | 3 | 4 | 5 | 6 | 7 |
| DDP acid (prepared in Ex. I) | 834 | | 834 | 834 | 834 | 834 | 813. |
| Defective DDP acid (Ex. III) | | 743 | | | | | |
| Zinc oxide | 120 | | | 120 | 120 | 120 | 120. |
| Zinc carbonate | | 154 | | | | | |
| Heptanes | 145 | 145 | 145 | 145 | 145 | 145 | 145. |
| Distilled water | 30 | 30 | | 30 | 30 | 15 | 60. |
| Water added after DDP introduction | | | | ✓ | | | |
| Reaction time elapsed at water addition (min.) | 60 | 60 | | | 30 | 60 | 60. |
| Total reaction time (min.) | 90 | 90 | 90 | 90 | 90 | 90 | 90. |
| Reaction temperature (° F.) | 225 | 225 | 225 | 225 | 225 | 225 | 225. |
| Water removal time (min.) | 90 | 90 | 60 | 115 | 60 | 80 | 105. |
| $H_2S$ stability, 150–180° F./24 hrs | Pass | Pass | Pass | Pass | Pass | Pass | Pass. |
| Thermal stability, 320° F./30 min | do | do | do | do | do | do | Do. |
| Blended stability, 150° F | do.[1] | do.[1] | 7 min | 2 min | 1½ min | 3 min | Do.[1] |
| Ease of filtration | Good | Good | Good | Good | Good | Good | Poor. |
| Appearance | Clear | Clear | Clear | Clear | Clear | Clear | Milky. |

[1] 15 minutes.

The results summarized above clearly indicate the improved blended stability resulting from the addition of water during the neutralization process of this invention (Form 1 and 2 v. Form 3). The results further indicate the advisability for adding approximately equimolar amounts of water, based on ZnO consumed (Form. 1 and 2 v. Form 6 and 7) at a point in time approximately two-thirds through the reaction period (Form. 1 and 2 v. Form. 4 and 5) in order to achieve the improved results.

EXAMPLE X

Satisfactory extension of the improved high temperature, high pressure, water addition neutralization procedure of this invention to larger scale equipment is indicated by the data presented in the following table. The DDP acids were prepared in stainless steel reactors from both good and defective phosphorus pentasulfide using the concentrations and process variables described in Example I. The preparation of conventional ZDDP products, using the procedure described in Example II, was also conducted on a scaled up level, these materials serving as controls.

|  | Pounds | | | |
|---|---|---|---|---|
| Formulation No. | 1 | 2 | 3 | 4 |
| DDP acid (prepared in Ex. I). | 46.3 |  | 48.7 |  |
| Defective DDP acid (Ex. III). |  | 46.3 |  | 49.25 |
| Heptanes | 8.0 | 8.0 | 8.0 | 8.0 |
| Zinc oxide | 6.8 | 6.8 | 6.8 | 6.8 |
| Distilled water | 1.32 | 1.32 |  |  |
| Reaction temp. (° F.) | 221–230 | 226–230 | 170–180 | 170–180 |
| Total reaction time (min.) | 90 | 90 | 180 | 180 |
| Time elapsed to water addition (min.). | 60 | 60 |  |  |
| Autogenous pressure (p.s.i.g.). | 28–31 | 32–35 | Atm. | Atm. |
| Water removal time (min.) | 330 | 240 | 240 | 240 |
| H₂S stability, 150°–180° F./24 hrs. | Pass | Pass | Pass | 10 min. |
| Thermal stability, 320 °F./30 min. | do | do | Borderline | Fail |
| Blended stability, 150 °F./15 min. | do | do | Fail | Do. |

The results presented hereinabove clearly indicate that no substantial variations in stability occur upon scaling-up the novel neutralization procedure of this invention.

Summarizing, it is thus seen that this invention provides an improved neutralization procedure for the preparation of stable zinc dialkyl dithiophosphate products.

Variations may be made in procedures, proportions and materials without departing from the scope of the invention as defined by the following claims.

What is claimed is:

1. A process for the preparation of zinc dialkyl dithiophosphates which comprises the steps of (1) reacting, in a closed system, a dialkyl dithiophosphoric acid and a basic zinc salt in a heptane solvent at a temperature ranging from about 180°–300° F. and under autogenous pressure conditions; (2) adding water to said reaction system in an amount ranging from about 0.75 to 1.50 molar, based on the basic zinc salt consumed in the reaction, and at a point in time approximately ⅗ to ⁷⁄₁₀ through the reaction; (3) removing the water present in the reaction product; and (4) isolating and recovering the zinc dialkyl dithiophosphate product.

2. The process of claim 1, wherein said basic zinc salt is selected from the group consisting of zinc oxide, zinc hydroxide and zinc carbonate.

3. The process of claim 1, wherein said basic zinc salt is present in a concentration ranging from a stoichiometric quantity up to about a 30% excess over the stoichiometric quantity, the latter concentration range being based on the weight of the dialkyl dithiophosphoric acid charged to the system.

4. The process of claim 1, wherein said reaction is conducted at a temperature ranging from about 210°–240° F.

5. The process of claim 1, wherein an equimolar amount of water, based on the basic zinc salt consumed in the reaction, is added to the reaction system at a point in time ⅔ through the reaction.

References Cited
UNITED STATES PATENTS 3,335,158   8/1967   Goldsmith _____ 260—429.9
3,396,183   8/1968   Brasch et al. _____ 260—429.9 X TOBIAS E. LEVOW, Primary Examiner H. M. S. SNEED, Assistant Examiner